United States Patent [19]
Gloge et al.

[11] 3,871,935
[45] Mar. 18, 1975

[54] METHOD OF ENCAPSULATING AND TERMINATING THE FIBERS OF AN OPTICAL FIBER RIBBON

[75] Inventors: Detlef Christoph Gloge, Red Bank; Peter William Smith, Colts Neck, both of N.J.

[73] Assignee: Bell Telephone Laboratories, Incorporated, Murray Hill, N.J.

[22] Filed: Mar. 14, 1974

[21] Appl. No.: 451,217

[52] U.S. Cl............ 156/158, 156/7, 156/245, 156/266, 156/304, 264/271, 350/96 B
[51] Int. Cl............................................ B65h 69/02
[58] Field of Search....... 156/7, 157, 158, 264, 266, 156/245, 296, 304, 502, 544; 264/257, 259, 271; 65/4; 350/96, 96 B

[56] References Cited
UNITED STATES PATENTS

| | | |
|---|---|---|
| 3,195,219 | 7/1965 | Woodcock et al............... 65/4 X |
| 3,333,278 | 7/1967 | Hawkins et al..................... 65/4 X |
| 3,798,099 | 3/1974 | Marcatili............................ 156/158 |
| 3,810,802 | 5/1974 | Buhite et al. ...................... 156/158 |

*Primary Examiner*—William A. Powell
*Attorney, Agent, or Firm*—S. Sherman

[57] ABSTRACT

This application discloses a method of encapsulating and terminating the fibers of an optical fiber ribbon in a manner such that said fibers can be efficiently coupled to the fibers of a similarly terminated other fiber ribbon comprising the steps of: (1) dissolving the protective jacket along a portion of said fiber ribbon thereby exposing the individual fibers; (2) placing the fibers thus exposed in a mold and aligning said fibers in a predefined manner relative to each other; (3) encapsulating a portion of said exposed fibers thereby fixing said fibers in said predefined manner; and (4) dividing said encapsulated portion along a plane perpendicular to the axes of said fibers, thereby exposing the transverse surfaces of said fibers.

5 Claims, 20 Drawing Figures

3,871,935

3,871,935

METHOD OF ENCAPSULATING AND TERMINATING THE FIBERS OF AN OPTICAL FIBER RIBBON

This invention relates to a method of encapsulating and terminating groups of optical fibers, and for connecting same.

BACKGROUND OF THE INVENTION

There is a great deal of current interest in the use of optical fibers as waveguides at optical frequencies in much the same way as wires and metallic waveguides are used at lower signal frequencies. However, if such fibers are to be readily used in this manner, it is evident that there must be a quick, convenient and accurate means of connecting sections of fibers together in the course of their use.

To be practical, however, any means of connecting fibers must resolve the alignment problem. When one considers that optical fibers have core diameters ranging from a few microns to a few mils, and that an alignment error of as little as half a diameter will result in a coupling loss of about 3dB, the magnitude of the problem becomes apparent.

A related problem encountered in connecting optical fibers is the fiber end preparation. In order to obtain a low-loss connection, the abutting end surfaces of the fibers to be connected must be optically smooth and perpendicular to the fiber axis. Conventional grinding and polishing techniques would be much too time consuming, too costly and, in general, impractical, especially when practiced in the field by service and maintenance personnel.

It is, accordingly, the broad object of the present invention to prepare the ends of groups of optical fibers in such a manner as to facilitate connecting one such group of fibers to another.

SUMMARY OF THE INVENTION

In accordance with the present invention, the end of a fiber ribbon, comprising a plurality of optical fibers embedded in a common protective jacket, is terminated by: (1) dissolving the protective jacket along a portion of said jacket thereby exposing the individual fibers; (2) placing the fibers thus exposed in a mold which aligns said fibers in a predefined manner relative to each other; (3) encapsulating a portion of said exposed fibers thereby fixing said fibers in said predefined manner; and (4) dividing said encapsulated portion along a plane perpendicular to the axes of said fibers, thereby exposing the transverse surfaces of said fibers.

The fibers of pairs of fiber ribbons thus encapsulated can then be connected together by placing the exposed fiber ends in contact with each other. If a permanent connection, (i.e., a splice) is to be made, the two encapsulated ends are placed within a positioning jig and bonded together. Advantageously, the mold used during the encapsulating step can also be used as the positioning jig. If a common structure is used both as mold and jig it need not be made to any specific tolerance and, as such, can be relatively inexpensive.

A variety of cross-sectional encapsulation shapes can be used to ensure accurate alignment of the coupled fibers.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
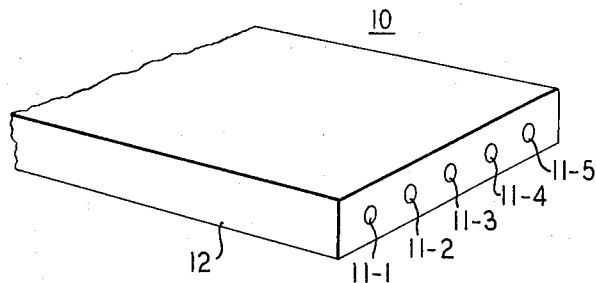
FIG. 1 shows an end of a fiber ribbon containing five fibers.

Referring to the drawings, FIG. 1 shows an end view of a fiber ribbon 10 comprising a plurality of optical fibers 11-1, 11-2 ... 11-5, embedded in a common protective jacket 12. In the more usual case where the fibers are individually clad, the jacket is advantageously made of a lossy material to reduce crosstalk among the several fibers. Where crosstalk is not an important consideration, the fibers can be unclad. In this latter case the jacket also serves as the cladding for the respective fibers and, as such, is made of a low-loss material having a lower refractive index than the fibers. For purposes of illustration, five fibers are shown. Obviously, more or fewer fibers can be included.

The object of the invention, as indicated hereinabove, is to terminate the above-described fiber ribbon in such a manner that each of the fibers can be efficiently coupled to a different fiber of a similarly terminated other fiber ribbon. If we require that the fibers at any point along a fiber ribbon be capable of being directly coupled to the fibers at every point along another fiber ribbon with the high degree of precision required to make an efficient junction, it would be necessary to fabricate the ribbons to within very strict tolerances. Specifically, the overall dimensions of the jacket, and the relative spacing of the fibers within the jacket would have to be very carefully controlled so as to limit the transverse axial displacement between every pair of coupled fibers to less than one-tenth of the fiber core diameter.

Since, as a practical matter, most of the fiber ribbon produced will never have to be joined to another fiber, such a high degree of overall accuracy is not necessary, and if imposed uniformly would greatly and needlessly increase the cost of the fiber ribbon. Advantageously, the present invention avoids the need for such a high degree of structural accuracy.

Figure 2:
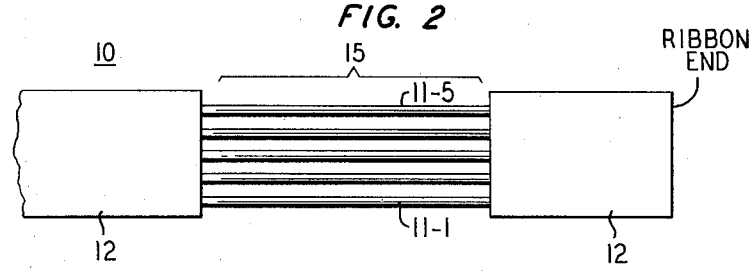
FIG. 2 shows a portion of the fiber ribbon protective jacket dissolved, thereby exposing the individual fibers.

The present invention is a process for terminating fiber ribbons which permits efficient coupling between pairs of ribbons while avoiding the need for the type of structural accuracy referred to hereinabove. The first step in this process involves dissolving a short length 15 of the jacket along ribbon 10, as illustrated in FIG. 2. This exposes a coextensive length of fibers 11-1, . . . 11-5. The latter, however, are still held in their same relative positions at both ends of length 15 by the adjacent regions of undissolved jacket.

Figure 3:
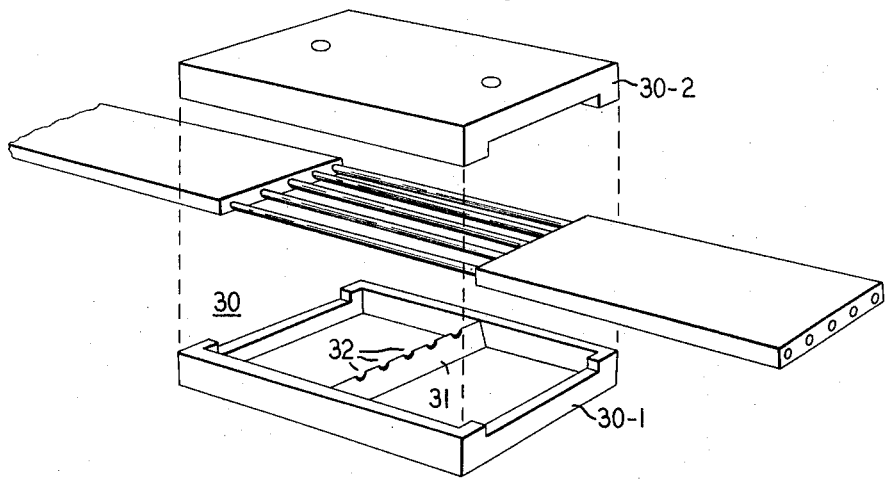
FIGS. 3, 4 and 5 show the exposed fibers and the encapsulating mold.
Figure 4:
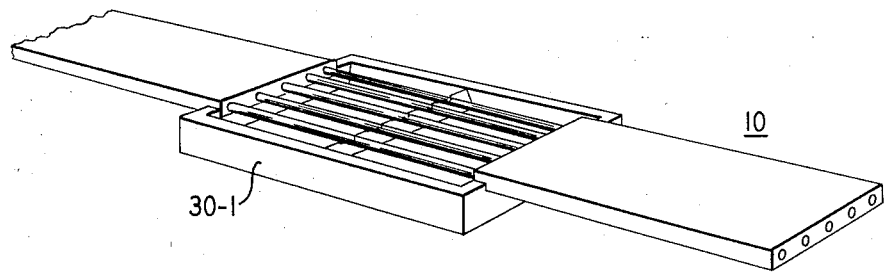

After being thus exposed, the fibers are placed in an encapsulating mold 30 which, as illustrated in FIG. 3, is divided into two portions 30-1 and 30-2. The lower portion 30-1 includes a jig 31 which is provided with a series of grooves 32, dimensioned to receive the exposed fibers. FIG. 4 shows the fiber ribbon lowered into position within the lower mold portion 30-1 and the fibers resting in the jig grooves.

Figure 5:
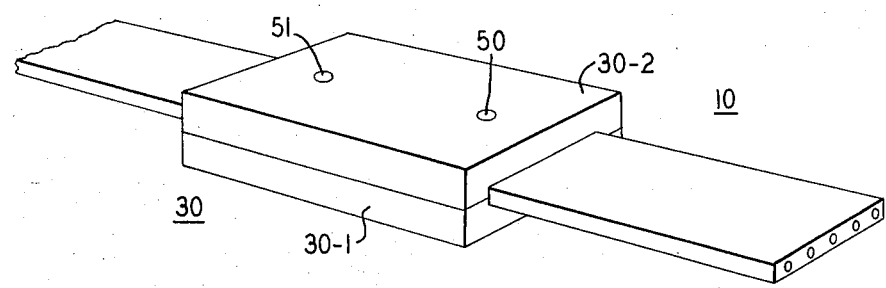

FIG. 5 shows the upper mold portion 30-2 in place and the fibers ready for encapsulation. This is done by injecting a suitable encapsulating material into the mold through holes 50 and 51 in the upper mold portion 30-2. In general, any compatible encapsulating material can be used, consistent with the limitations referred to hereinabove in connection with jacket 12. Advantageously, the encapsulating material will have a shrinkage, on hardening, of less than about 2 percent.

Figure 6:
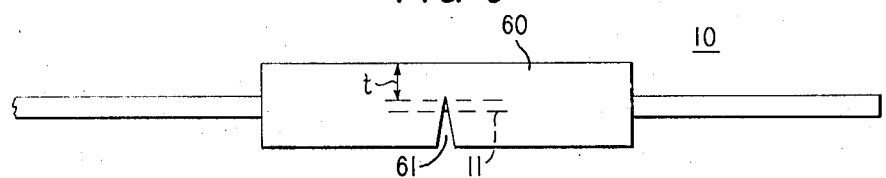
FIG. 6 shows the encapsulated fibers.

After the encapsulating material has set, the encapsulated fibers are removed from the mold and appear as shown in FIG. 6. Fibers 11 are completely surrounded by the encapsulating material 60 except for an exposed region along a groove 61 formed by jig 31.

To expose the fiber ends, the encapsulated portion is divided into two parts along a plane that is perpendicular to the fiber axes. This can be done in any convenient way. However, if the encapsulating material is brittle, the method of breaking fibers to produce a fine mirror surface, as described in applicants' copending application Ser. No. 412,293, filed Nov. 2, 1973, can be advantageously used. In accordance with this method, the fibers are either scored before they are encapsulated, or they are scored over the region exposed along groove 61. This can be done by a knife edge or by an abrasive spray. After scoring, the encapsulation is subjected to a nonuniform tensile stress as taught in said copending application.

Advantageously, the fibers are positioned in the mold such that the requisite nonuniform tensile stress distribution is realized simply by bending the encapsulation. In particular, this can be done if the distance $t$ from the top of the encapsulation to the fibers is as given by $$t = 2a \; \sqrt{E_s/E_p},$$

where
  $a$ is the fiber radius,
  $E_s$ is Young's modulus of the fiber;
and
  $E_p$ is Young's modulus of the encapsulating material.

Example:
If $E_s = 10^7$ psi
and $E_p = 5 \times 10^5$ psi,
a mirror surface can be obtained simply by bending the encapsulation if $t/a = 9$.

A suitable encapsulating material, having the requisite brittleness for use with this process, is Polyester Resin No. 5011, manufactured by Hastings Corp., to which there has been added one percent methyl ethyl keton peroxide in dymethyl phthalane.

Figure 7:
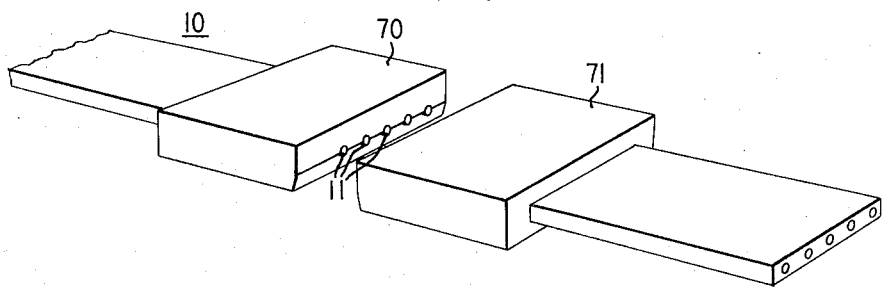
FIG. 7 shows the exposed end of the encapsulated fibers after the encapsulation has been divided.

FIG. 7 shows the resulting fiber ribbon end termination 70 produced in accordance with the present invention. The other ribbon portion 71 produced by the dividing step is discarded.

Figure 8:
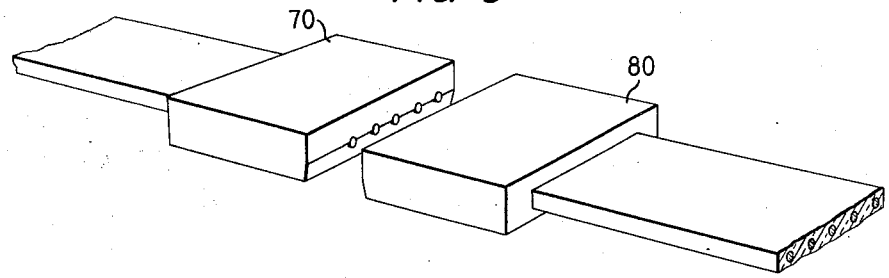
FIG. 8 shows two fiber ribbons, terminated in accordance with the present invention.
Figure 9:
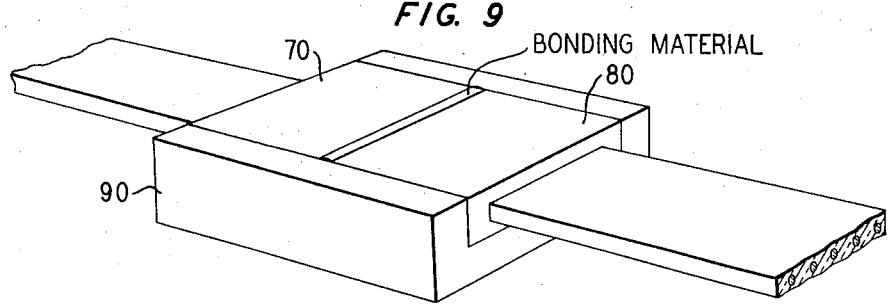
FIG. 9 shows the two fiber ribbons of FIG. 8 in a positioning jig for splicing purposes.

The above-described series of steps is repeated for the end of the other fiber ribbon that is to be coupled to ribbon 10. The result is to obtain a second, correspondingly terminated fiber ribbon 80, as shown in FIG. 8. Since the two encapsulated ends 70 and 80 were made in the same mold, their overall exterior dimensions are identical and the fibers, having been positioned by means of the same grooved jig, are accurately aligned relative to each other. The two encapsulated ends 70 and 80 can then be coupled together simply by placing them in a positioning jig 90, as shown in FIG. 9. A cover plate, not shown, may be used to hold the two ends in position. An index-matching epoxy, or other suitable bonding material is used to cement the two encapsulated end portions together if a permanent connection is to be made. After the bonding material has set, the fiber ribbons may be removed from jig 90, completing the encapsulating and splicing process.

Figure 10:
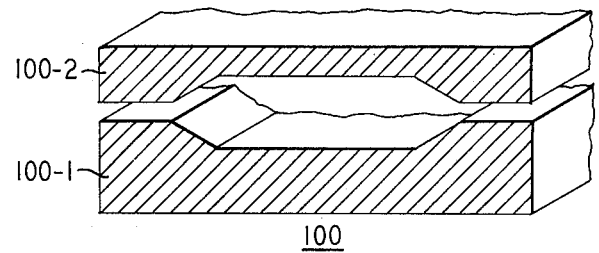
FIG. 10 shows a cross-sectional view of an encapsulating mold with tapered edges.
Figure 11:
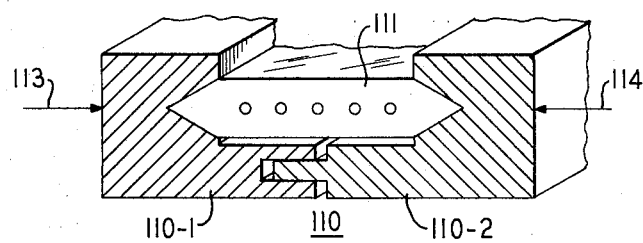
FIG. 11 shows a positioning jig with tapered edges for receiving a fiber ribbon encapsulated in the mold illustrated in FIG. 10.

As indicated hereinabove, a misalignment of as little as half a core diameter can cause a 3 dB loss in fiber-to-fiber transmission across a splice. Preferably, the total misalignment will not exceed one-tenth of the core diameter. With this as a goal, the three-sided positioning jig 90 shown in FIG. 9 may be difficult to use. Because of the large surface area that is in contact with the encapsulation, the smallest dust particle or burr on either the encapsulation or jig could adversely affect the final alignment. To minimize the potential for such misalignment, the mold and the positioning jig are advantageously designed so as to minimize the total contact area between the jig and the encapsulation. FIGS. 10 to 17, now to be considered, illustrate various means that can be employed to improve the positioning accuracy of the encapsulated ends during the splicing operation. For example, FIG. 10 shows a cross-sectional view of a modified encapsulating mold in which the sides of the two mold portions 100-1 and 100-2 are tapered. This will produce an encapsulation 111, shown in FIG. 11, having tapered ends which can be inserted into a positioning jig 110 having correspondingly tapered sides. As can be seen in FIG. 11, the result is to provide a means of constraining the fiber ribbon in both transverse directions by only contacting the tapered edges, thus greatly reducing the total contact area. The net result is to increase the positioning accuracy of the two fiber ribbons during the splicing operation.

The positioning jig 110 can be split longitudinally into two portions 110-1 and 110-2 and the ribbons held more securely during the splicing operation by applying a slight transverse force, as indicated by arrows 113 and 114.

Figure 12:
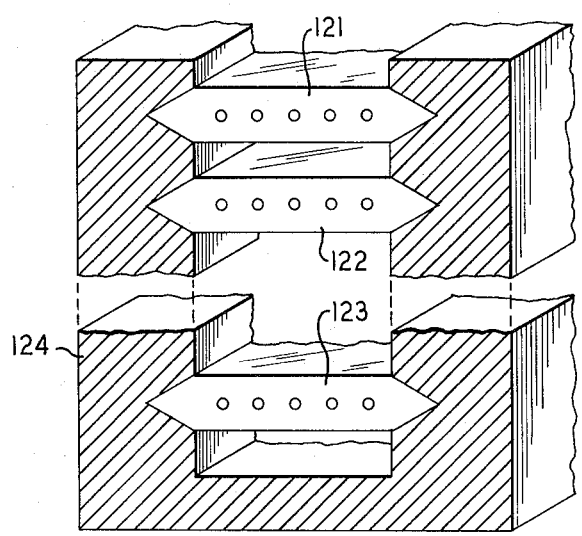
FIG. 12 shows a positioning jig for receiving a plurality of encapsulated fiber ribbons.

FIG. 12 illustrates how a plurality of ribbons 121, 122 . . . 123 can be spliced simultaneously in a multi-grooved positioning jig 124.

Figure 13:
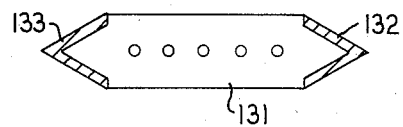
FIGS. 13 and 14 show two metal-reinforced encapsulated fiber terminations.
Figure 14:
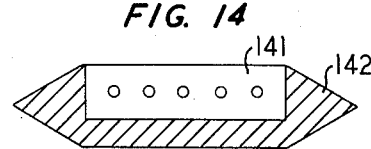

If it is found that the particular encapsulating material lacks the necessary dimensional stability required for a particular application, metal inserts can be incorporated into the mold to produce a metal-reinforced termination of the types illustrated in FIGS. 13 and 14.

In FIG. 13, a pair of metal v-shaped members 132 and 133 are secured to the tapered ends of a plastic inner portion 131. In the embodiment of FIG. 14, the metal portion 142 extends across the entire width of the termination 141.

Figure 15:
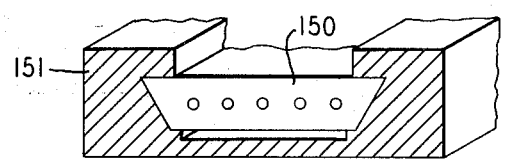
FIGS. 15, 16 and 17 show cross-sectional views of three alternate encapsulations.
Figure 16:
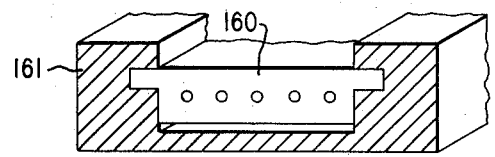
Figure 17:
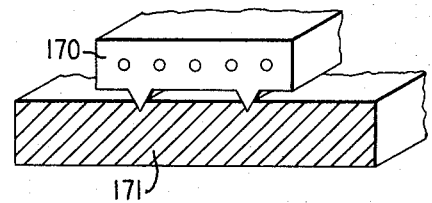

FIGS. 15, 16 and 17 show three alternate cross-sectional configurations 150, 160 and 170 for the encapsulated ends of a fiber ribbon, and positioning jigs 151, 161 and 171 for receiving the respective encapsulations.

Figure 18:
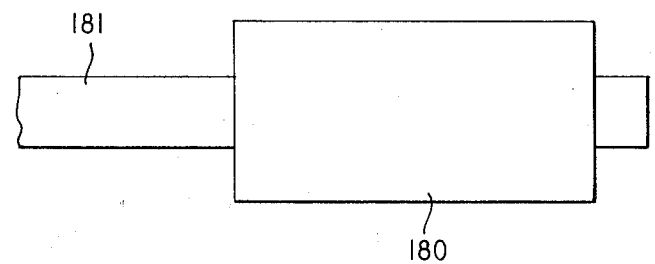
FIGS. 18, 19 and 20 illustrate the use of the encapsulating mold as the positioning jig.
Figure 19:
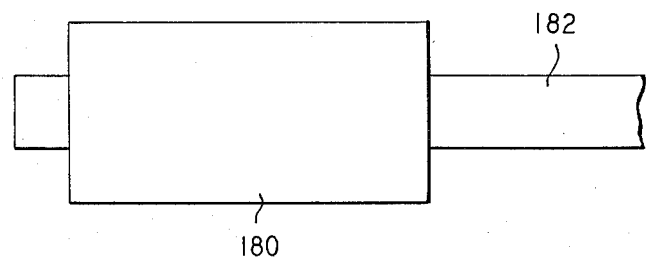
Figure 20:
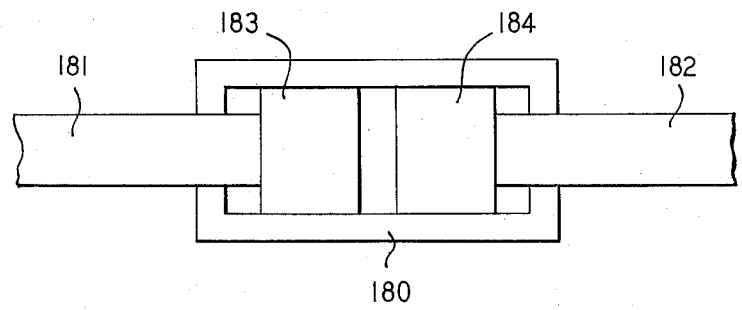

In the description given hereinabove, the encapsulating mold and the positioning jig are shown as distinctly separate entities. However, it will be noted that there is no requirement that any of the dimensions of the encapsulation be held to any specific tolerance. The only requirement is that the respective fibers in the two fiber ribbons to be coupled together are accurately aligned. The most convenient way of ensuring this is to use the encapsulating mold itself as the positioning jig. For example, if the end of the first fiber ribbon 181 is encapsulated by inserting the ribbon into mold 180 from the left end, as illustrated in FIG. 18, and the end of the second fiber ribbon 182 is encapsulated, in turn, by inserting the ribbon into the same mold 180 from the right end, as illustrated in FIG. 19, the individual fibers in the respective ribbons will be accurately aligned when positioned in the common mold during the splicing procedure, as illustrated in FIG. 20. Thus, the mold need not be made to any specific tolerance and, as such, relatively inexpensive molds can be used and still obtain very accurate results. Indeed, the mold can itself become an integral part of the splice.

Thus, in all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

What is claimed is:

1. A method of encapsulating and terminating an optical fiber ribbon comprising a plurality of optical fibers embedded in a common protective jacket including the steps of:

dissolving the protective jacket along a portion of said ribbon thereby exposing the plurality of individual fibers;

placing the fibers thus exposed in a mold which aligns said fibers in a predefined manner relative to each other;

adding an encapsulating material to said mold thereby encapsulating the fibers located therein in said predefined manner;

and dividing said encapsulated fibers into two parts thereby exposing the transverse surfaces of said fibers.

2. The method according to claim 1 including the added steps of:

placing one part of said encapsulated fibers into a positioning jig along with one part of similarly encapsulated fibers of a second fiber ribbon;

and splicing said two parts together.

3. The method according to claim 2 wherein said mold has a specified cross-sectional configuration and wherein said positioning jig has a cross-sectional configuration for receiving the encapsulated fibers produced in said mold.

4. The method according to claim 2 wherein said mold is used as said positioning jig.

5. The method according to claim 1 wherein said encapsulated fibers are located a distance $t$ from one surface of the encapsulation, as given by $$t = 2a \sqrt{E_s/E_p}$$

where $a$ is the radius of said fibers;

$E_s$ is Young's modulus of the fibers;

and $E_p$ is Young's modulus of the encapsulation material; and wherein said encapsulated fibers are divided into two parts simply by bending said encapsulation.

* * * * *